(12) United States Patent
Lee et al.

(10) Patent No.: US 8,410,996 B2
(45) Date of Patent: Apr. 2, 2013

(54) DISPLAY DEVICE

(75) Inventors: Byung-Joo Lee, Gyeonggi (KR); Hyung-Ki Hong, Seoul (KR)

(73) Assignee: LG Display Co., Ltd., Seoul (KR)

( * ) Notice: Subject to any disclaimer, the term of this patent is extended or adjusted under 35 U.S.C. 154(b) by 861 days.

(21) Appl. No.: 12/003,763

(22) Filed: Dec. 31, 2007

(65) Prior Publication Data

US 2009/0009426 A1 Jan. 8, 2009

(30) Foreign Application Priority Data

Jul. 5, 2007 (KR) .................. 10-2007-0067375

(51) Int. Cl.
*G09G 5/00* (2006.01)
(52) U.S. Cl. .............................. 345/6; 345/1.1; 345/102
(58) Field of Classification Search .................. 345/6–9, 345/102, 1.1–1.3; 359/462–477; 348/42–60; 349/15
See application file for complete search history.

(56) References Cited

U.S. PATENT DOCUMENTS

| | | | |
|---|---|---|---|
| 4,717,949 A | 1/1988 | Eichenlaub | 358/3 |
| 5,396,350 A * | 3/1995 | Beeson et al. | 349/62 |
| 6,064,424 A | 5/2000 | van Berkel et al. | |
| 6,377,295 B1 * | 4/2002 | Woodgate et al. | 348/59 |
| 7,165,874 B2 * | 1/2007 | Nagakubo et al. | 362/623 |
| 7,561,217 B2 * | 7/2009 | Hu et al. | 349/15 |
| 2003/0090607 A1 * | 5/2003 | Kamijo | 349/96 |
| 2006/0152812 A1 | 7/2006 | Woodgate et al. | |
| 2007/0047221 A1 * | 3/2007 | Park | 362/97 |
| 2007/0200121 A1 * | 8/2007 | Lankhorst et al. | 257/79 |
| 2009/0040426 A1 * | 2/2009 | Mather et al. | 349/65 |

FOREIGN PATENT DOCUMENTS

| | | |
|---|---|---|
| DE | 10 2005-010974 A1 | 9/2006 |
| EP | 0 791 847 A1 | 8/1997 |
| WO | 2005071474 A2 | 8/2005 |

OTHER PUBLICATIONS

Taiwanese Office Action (Application No. 096150995) dated Mar. 20, 2012, with English translation.

* cited by examiner

*Primary Examiner* — Amare Mengistu
*Assistant Examiner* — Premal Patel
(74) *Attorney, Agent, or Firm* — Morgan, Lewis & Bockius LLP

(57) ABSTRACT

A display device includes a display panel including first to fourth pixels in a first direction, wherein each of the first to fourth pixels has a first width in the first direction and a length more than the width and in a second direction; and a backlight unit including first and second line light regions supplying light to the display panel to display three-dimensional images, wherein the first and second line light regions have a slanted angle with respect to the second direction, wherein light from the first line light region comes to right and left eyes of a viewer through the first and second pixels, respectively, and light from the second light region comes to the right and left eyes through the third and fourth pixels, respectively, wherein the display device has K view points.

11 Claims, 12 Drawing Sheets

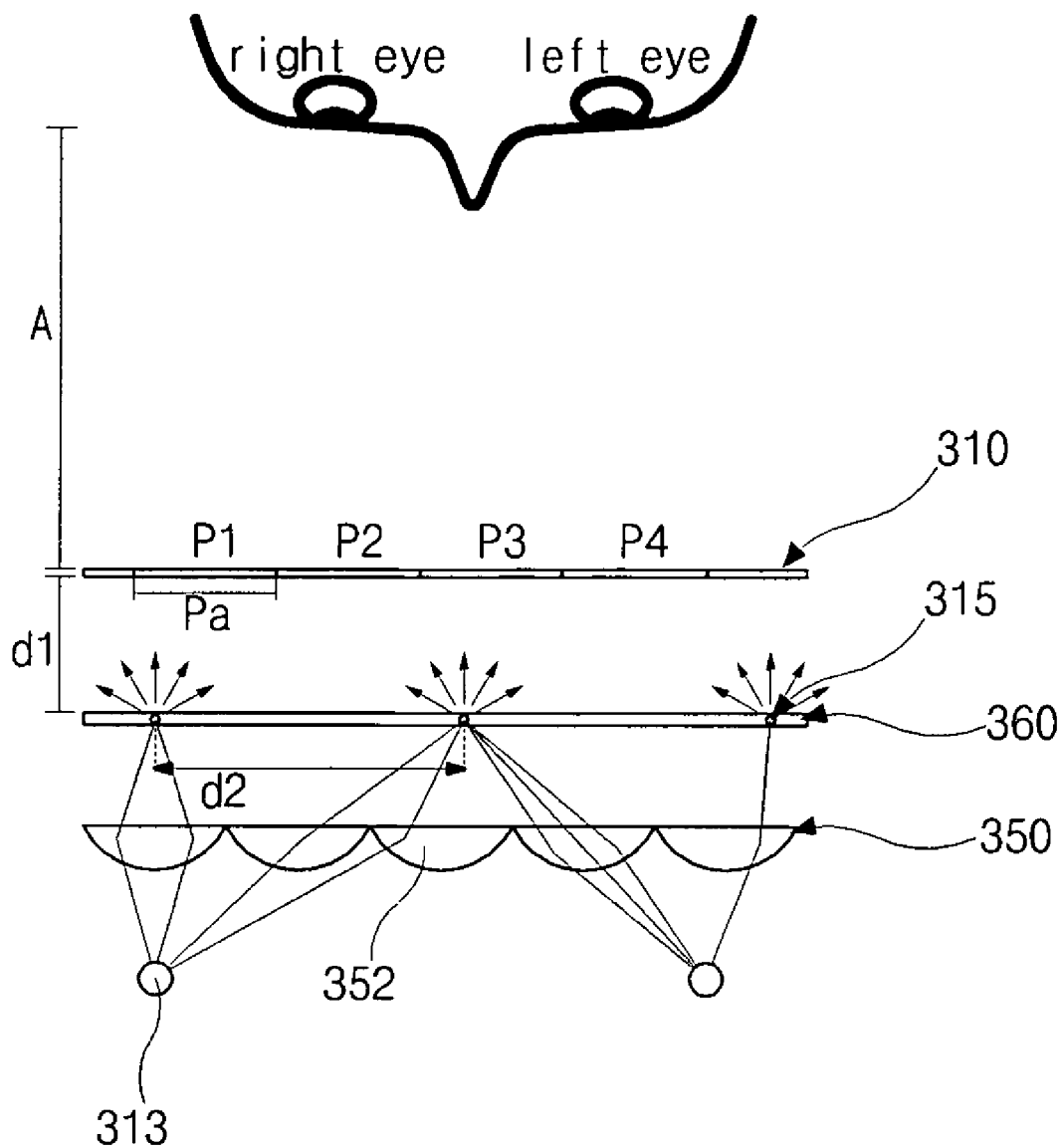

DISPLAY DEVICE

This application claims the benefit of Korean Patent Application No. 10-2007-0067375, filed in Korea on Jul. 5, 2007, which is hereby incorporated by reference in its entirety.

BACKGROUND OF THE INVENTION

1. Field of the Invention

The invention relate to a display device.

2. Discussion of the Related Art

A two-dimensional display device is generally used. Recently, because of wideband communication networks, a three-dimensional display device has been researched and developed.

There are various types of three-dimensional image displays with various types, for example, a volumetric type, a holographic image type, a stereographic type and the like. The volumetric type is used for three-dimensional computer graphics or an I-MAX movie. The holographic type is used for a holographic image. The volumetric type and the holographic type require large amounts of data and result in a high cost. So, presently, the stereographic type is used widely.

The stereographic type display device displays a three-dimensional image using binocular parallax. When the right and left eyes look at respective two two-dimensional images, the two two-dimensional images are transferred to the brain and then the brain mixes the two two-dimensional images. Thus, three-dimensional images having depth and reality are perceived. The stereographic type display device includes a display device that uses specific glasses and a display device without glasses. The stereographic type display device without glasses is preferred to the stereographic type display device that uses the specific glasses because the stereographic type display device without glasses does not need the separate glasses. The stereoscopic display devices without glasses are divided into a parallax barrier type, a lenticular type, and the like. Of these types, presently, the parallax barrier type has been typically used.

FIGS. 1A and 1B are perspective and cross-sectional views, respectively, illustrating a parallax barrier type display device according to the related art.

Referring to FIGS. 1A and 1B, the parallax barrier type display device 11 includes a liquid crystal display panel 15 having a plurality of pixels P, a backlight unit supplying light to the liquid crystal panel 15 and including a reflection sheet 35, a plurality of lamps 20 and a plurality of optical sheets 25, and a parallax barrier 30.

The liquid crystal panel 15 includes right and left eye pixels alternately arranged to simultaneously display a left-eye image and a right-eye image. The parallax barrier 30 includes barriers 31 and slits 32 alternately arranged for light from the left-eye and right-eye pixels to selectively pass through the parallax barrier 30. A viewer combines the left and right images to perceive a three-dimensional image by parallax of both eyes.

However, because the related art parallax barrier type display device uses the parallax barrier blocking light through the barriers, brightness is reduced.

Further, because the related art parallax barrier type display device is used only as a three-dimensional display device, it can not normally display two-dimensional images.

SUMMARY OF THE INVENTION

Accordingly, embodiments of the invention are directed to a display device and a method of displaying an image that substantially obviates one or more of problems due to limitations and disadvantages of the related art.

An advantage of the invention is to provide a display device and a driving method thereof that can increase brightness and selectively display two and three-dimensional images.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the invention, as embodied and broadly described, according to an aspect of the invention, a display device includes a display panel including first to fourth pixels in a first direction, wherein each of the first to fourth pixels has a first width in the first direction and a length more than the width and in a second direction; and a backlight unit including first and second line light regions supplying light to the display panel to display three-dimensional images, wherein the first and second line light regions have a slanted angle with respect to the second direction, wherein light from the first line light region comes to right and left eyes of a viewer through the first and second pixels, respectively, and light from the second light region comes to the right and left eyes through the third and fourth pixels, respectively, wherein the display device has K view points.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIG. 9 is a view illustrating a display device according to a third embodiment of the present invention.

DETAILED DESCRIPTION OF THE PREFERRED EMBODIMENTS

Reference will now be made in detail to the illustrated embodiments of the present invention, which are illustrated in the accompanying drawings.

Figure 1A:
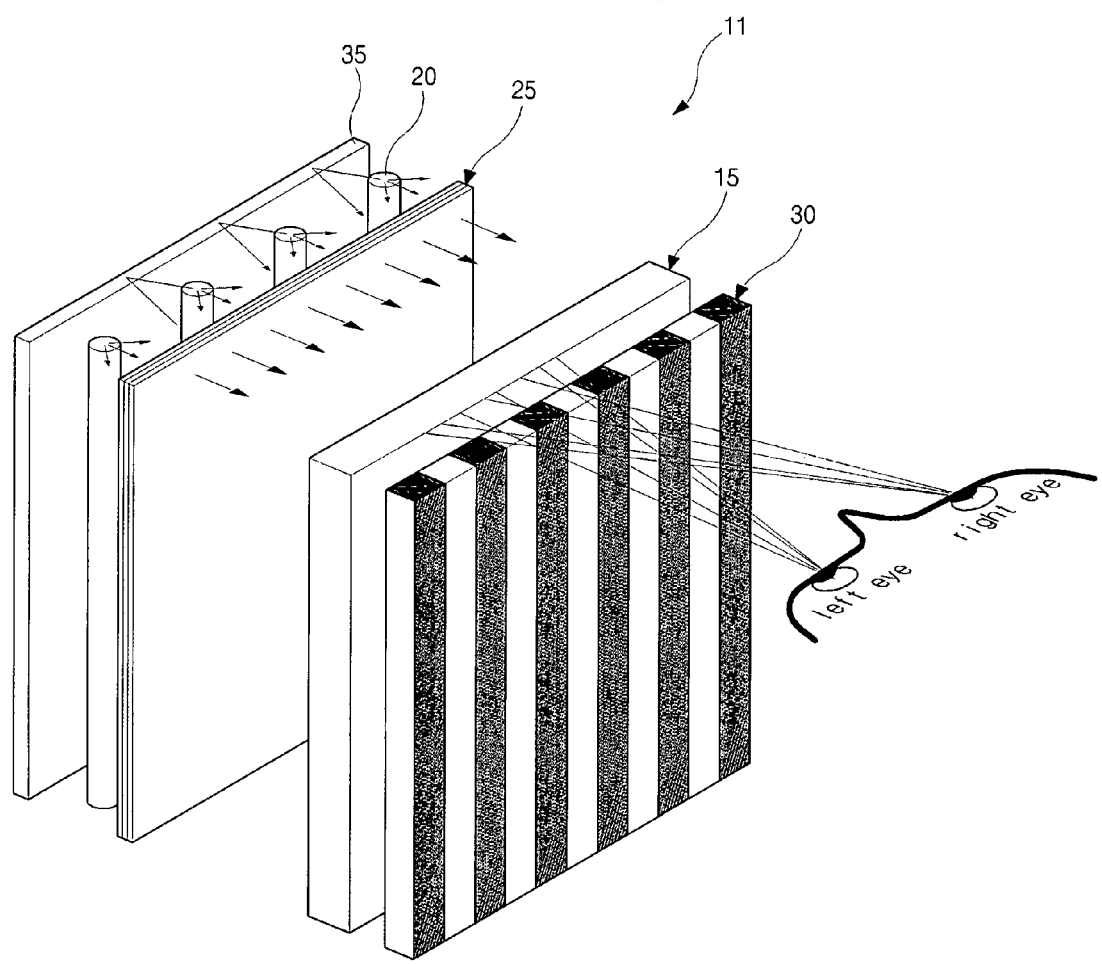
FIGS. 1A and 1B are perspective and cross-sectional views, respectively, illustrating a parallax barrier type display device according to the related art.
Figure 1B:
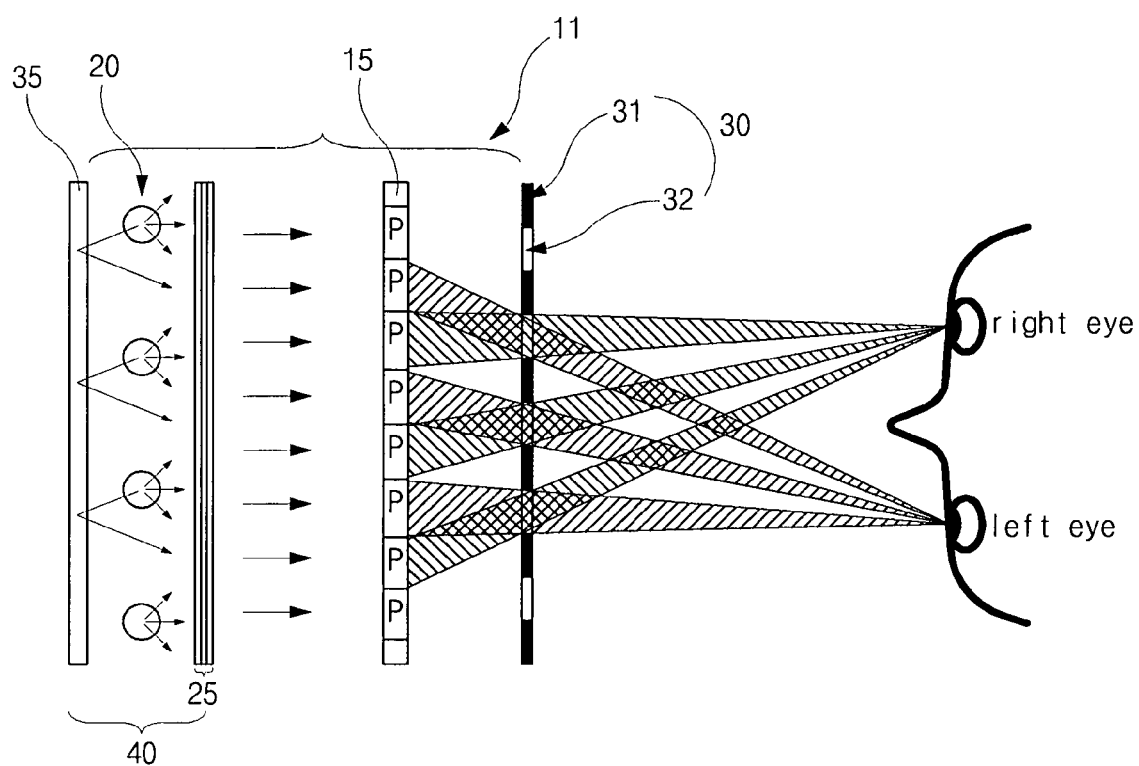
Figure 2A:
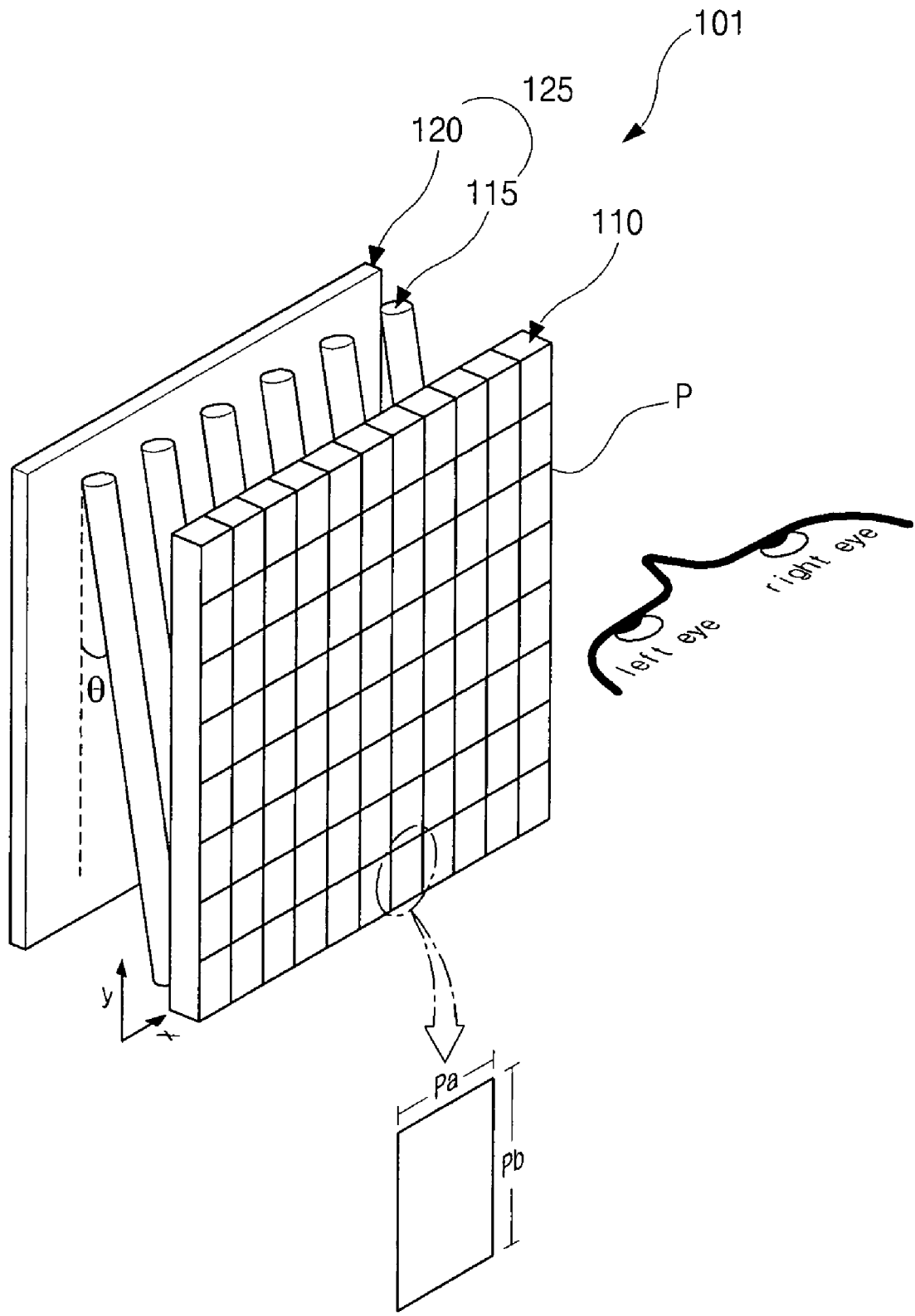
FIGS. 2A and 2B are perspective and cross-sectional views, respectively, illustrating a display device according to a first embodiment of the invention.
Figure 2B:
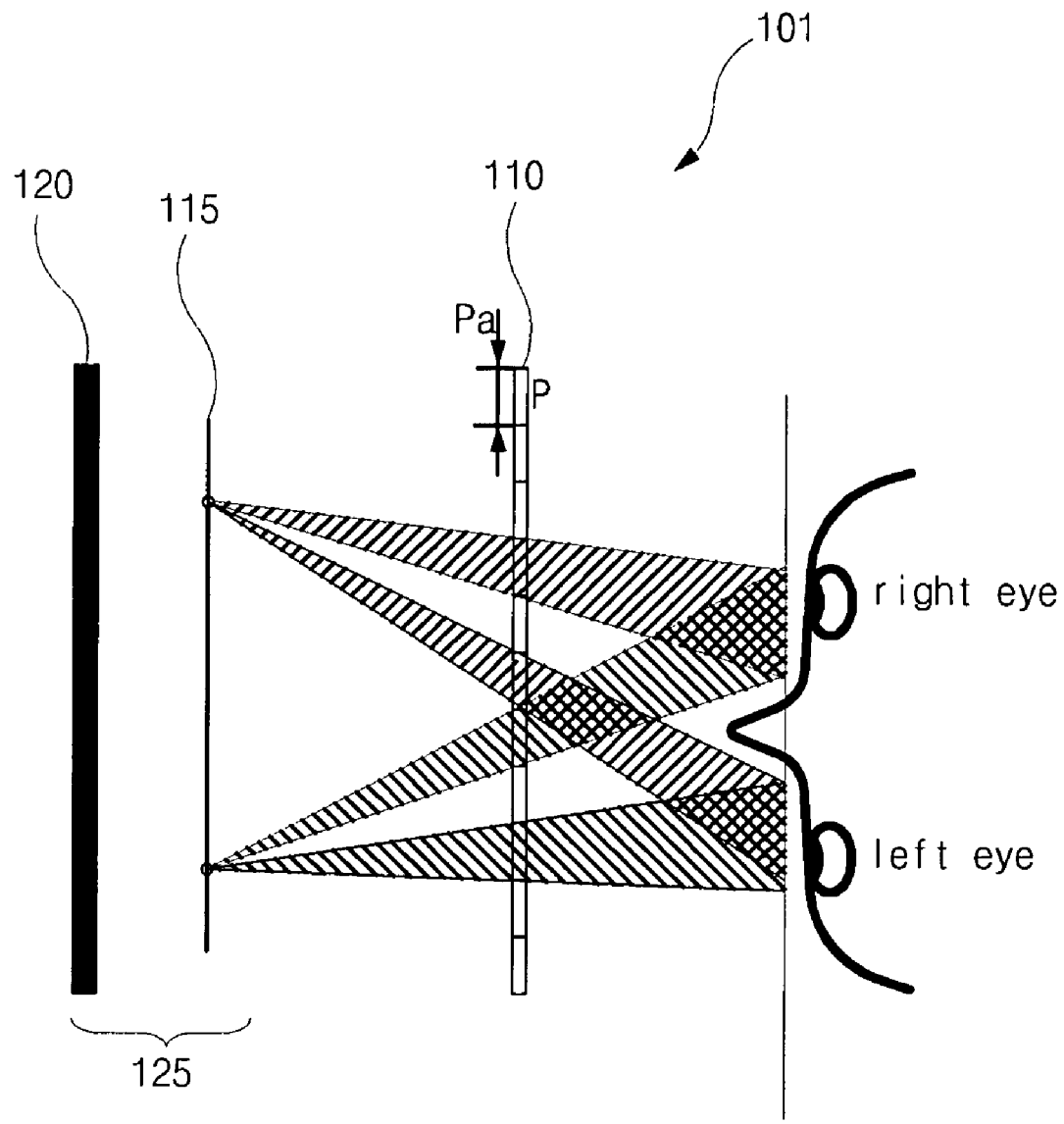

FIGS. 2A and 2B are perspective and cross-sectional views, respectively, illustrating a display device according to a first embodiment of the invention.

Referring to FIGS. 2A and 2B, the display device 101 according to the first embodiment includes a display panel 110 including a plurality of pixels P, and a backlight unit 125. The backlight unit 125 includes an absorbing sheet 120 and a plurality of line light sources 115. A plurality of line light regions are located at a plane parallel with the display panel 110, and the plurality of line light sources 115 are located at the plurality of line light regions, respectively.

The display panel 110 may include a liquid crystal panel. The liquid crystal panel may include first and second substrates and a liquid crystal layer between the first and second substrates.

The display device 101 according to the first embodiment may not employ the parallax barrier of the related art and the optical sheets of the related art. In other words, a viewer may directly view the display panel 110 without the parallax barrier and the display panel 110 may be directly over the line light sources 115. Accordingly, brightness can increase and weight of the display device can be reduced.

The display panel 110 includes a plurality of pixels P. The pixel P may have a rectangular shape with a width Pa and a length Pb longer than the width Pa. The width Pa may be in an X-direction, and the length Pb may be in a Y-direction.

The line light sources 115 may be arranged in parallel and spaced apart. The line light source 115 may have a slanted angle θ with respect to the Y-direction. The line light source 115 may have a width equal to or less than the width Pa of the pixel P. By using the line light source with the slanted angle θ, the display device 101 may not employ the parallax barrier and the optical sheets of the related art.

The absorbing sheet 120 may be below the line light sources 115. The absorbing sheet 120 absorbs light incident thereon. Among light emitted from the line light sources 125, light not toward the display panel 110 may reflects on components of the display device 101 such as a bottom case (not shown). Such the reflected light may cause display quality of three-dimensional images degraded. Accordingly, to prevent this, the absorbing sheet 120 may be located below the line light sources 120, and the display panel 110 may be supplied with light directly emitted from the line light sources 115.

Figure 3:
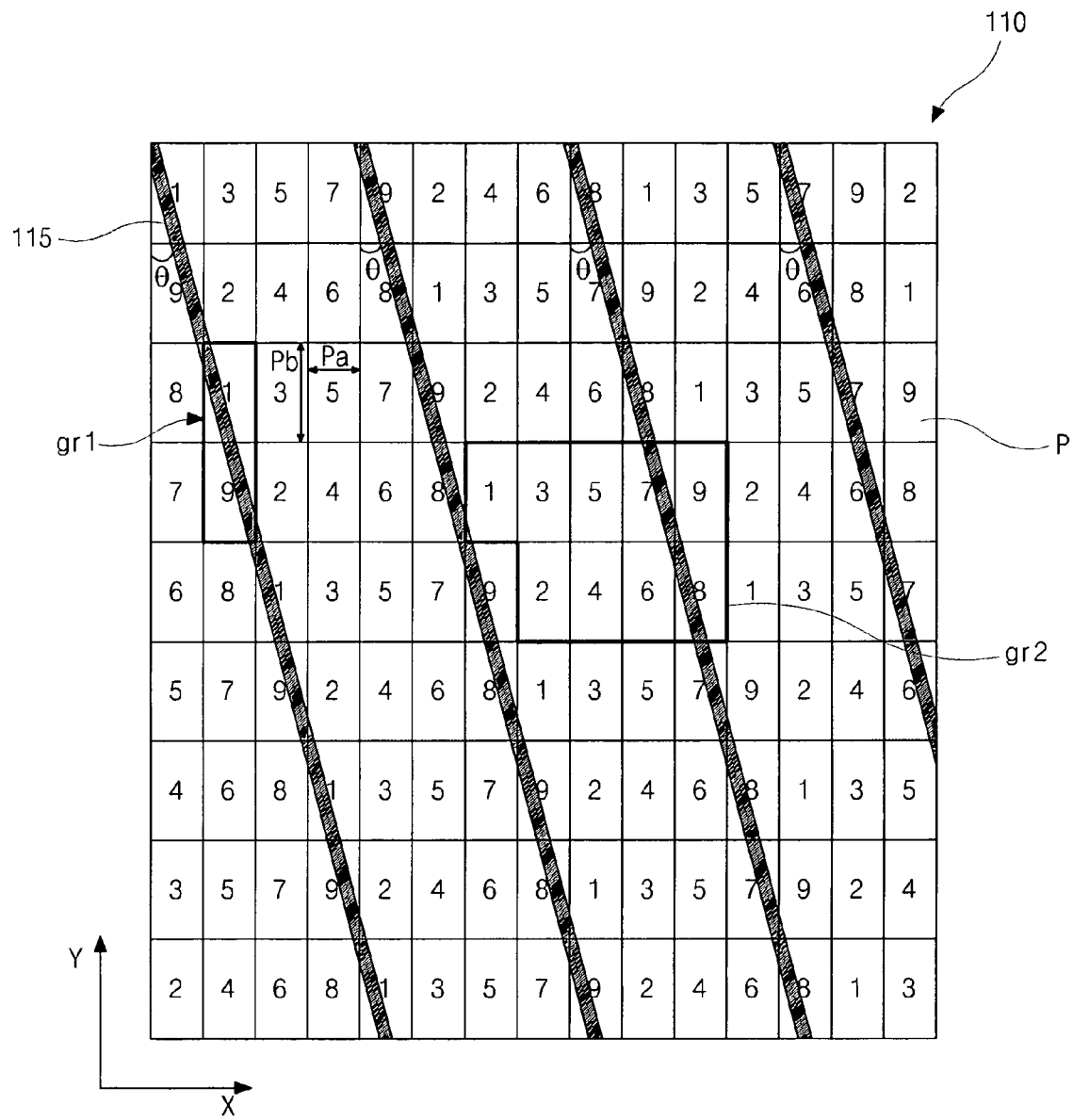
FIG. 3 is a plan view illustrating arrangement of line light sources of a display device according to the first embodiment of the present invention.

FIG. 3 is a plan view illustrating arrangement of line light sources of a display device according to the first embodiment of the present invention.

Referring to FIG. 3, the line light source 115 has a slanted angle θ with respect to a Y-direction according to a first expression, $\theta = \tan^{-1}((M \cdot Pa)/(N \cdot Pb))$ (M and N are a natural number). For example, when the line light source 115 exactly passes through a rectangular gr1 consisting of two pixels P of a display panel 110, M may be a number of pixels in an X-direction i.e., 1, and N may be a number of pixels in the Y-direction i.e., 2. A width Pa of the pixel P may be a third of a length of the pixel P. Based upon these values, the slanted angle θ may be about 9.46 degrees angle ($\theta = \tan^{-1}(1/6)$).

Reference numbers "1" to "9" assigned to the pixels P represent that the pixels P having the reference numbers "1" to "9" are for nine view points, respectively, when the display device displays three-dimensional images. In other words, the pixels P having the reference number "1" display an image which is viewed at a first view point, and in a similar manner, the pixels P having the reference number "2" to "9" display images which are viewed at the corresponding view points.

When the display device has K view points, an image at each view point has a 1/K of a total resolution of the display device. In other words, the number of the view points and the resolution of the image at each view point are in inverse proportion. To display images appropriately, the number of the view points may be 5 to 9.

Figure 4A:
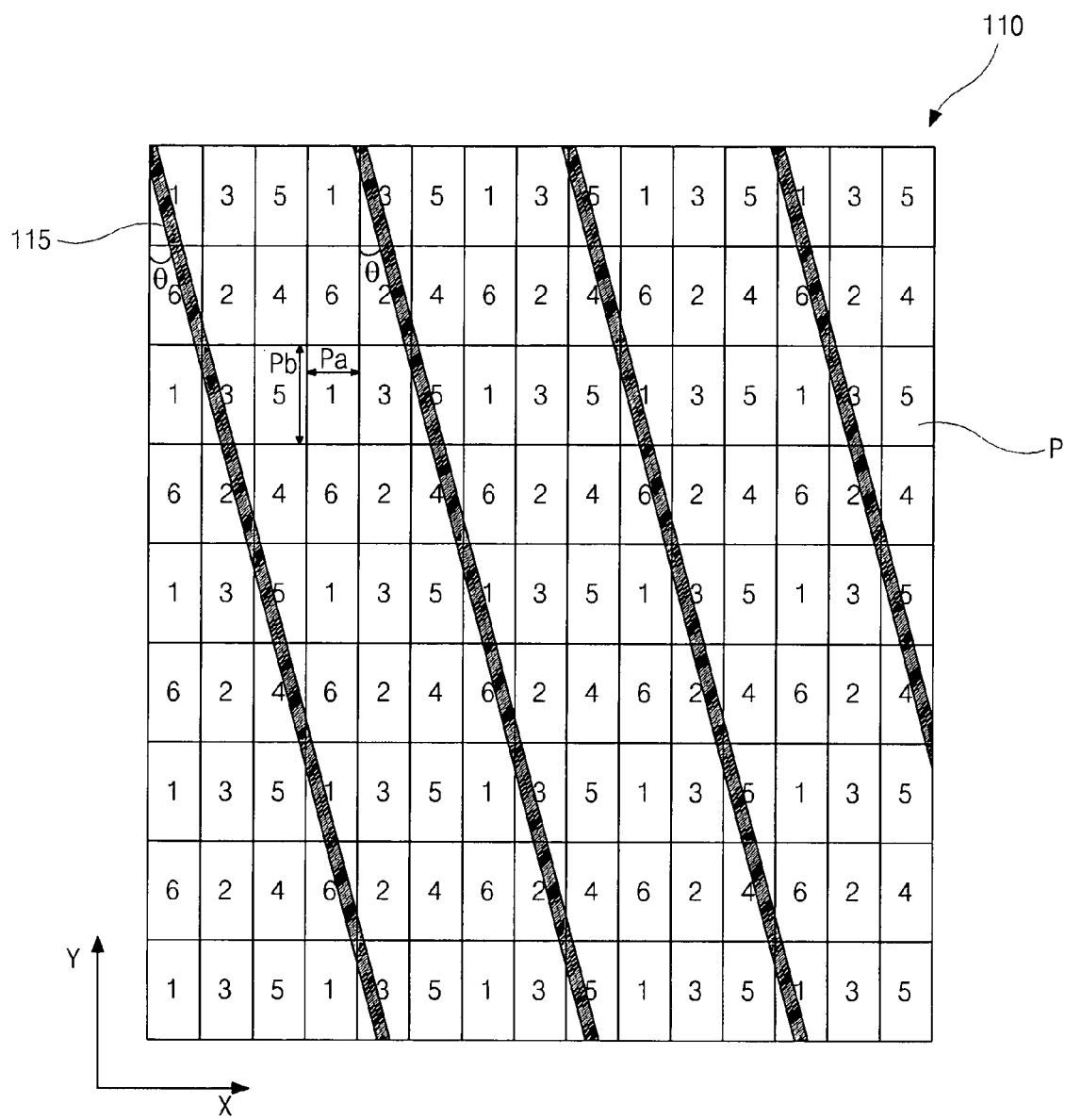
FIGS. 4A and 4B are plan views illustrating arrangement of pixels of display devices having even and odd view points, respectively, according to the first embodiment of the present invention.
Figure 4B:
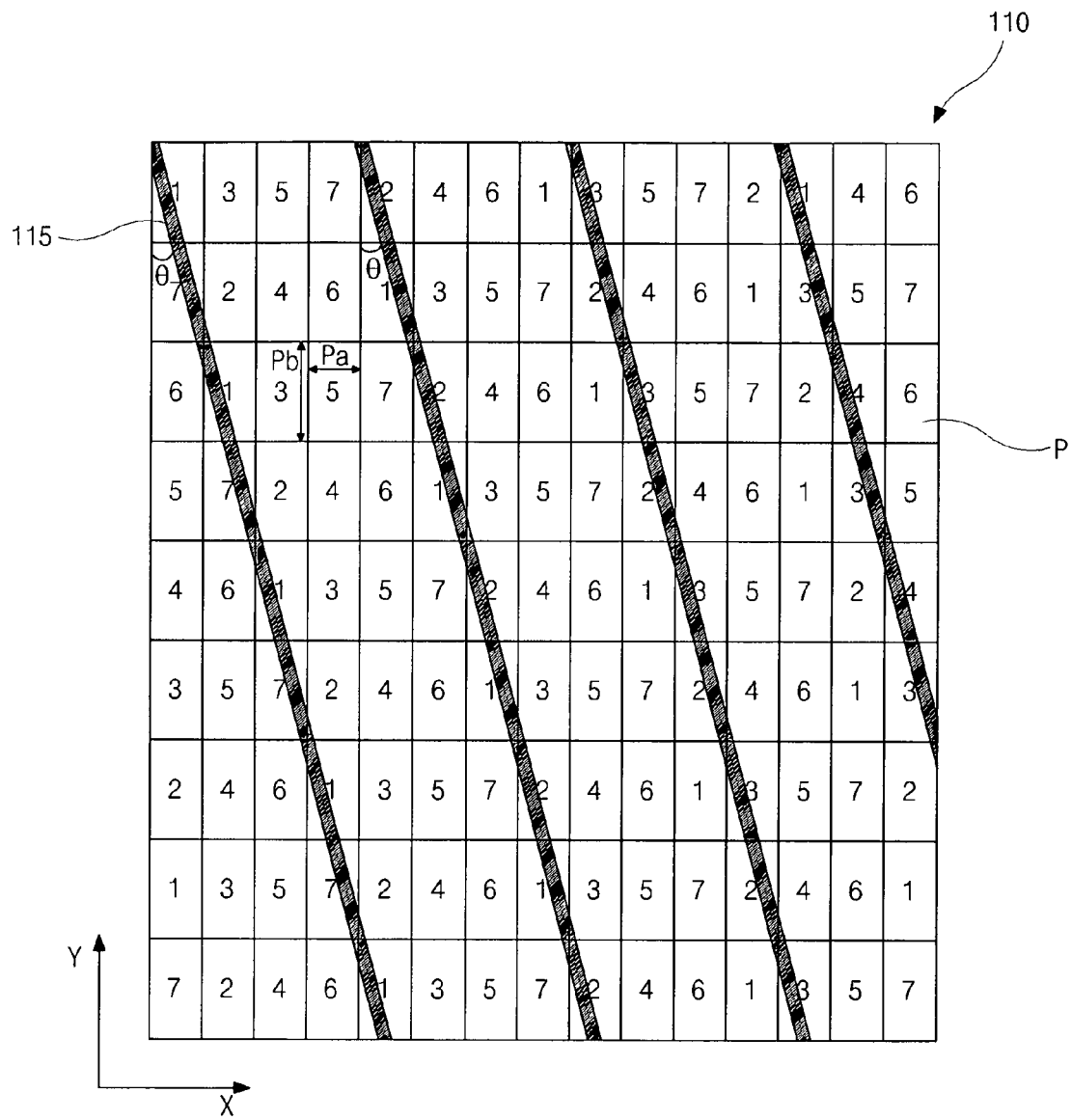

FIGS. 4A and 4B are plan views illustrating arrangement of pixels of display devices having even and odd view points, respectively, according to the first embodiment of the present invention.

Referring to FIG. 4A, the display device includes a display panel 110 having pixels P. The display device has even view points, for example, six view points. In a first line of an X-direction, odd reference numbers are alternately arranged and repeated, for example, "1,3,5,1,3,5, . . . ." In a second line of the X-direction, even reference numbers are alternately arranged and repeated, for example, "2,4,6,2,4,6, . . . ." The arrangements of the first and second lines are alternately in a Y-direction. In a column of the Y-direction having a reference number "1", highest even reference number i.e, "6" may be located next to the reference number "1".

Referring to FIG. 4B, the display device includes a display panel 110 having pixels P. The display device has odd view points, for example, seven view points. Arrangement of reference numbers of FIG. 4B may be similar to the arrangement of FIG. 3. In each line of an X-direction, odd reference numbers are alternately arranged and even reference-numbers are alternately arranged, and this arrangement is repeated, for example, "1,3,5,7,2,4,6,1,3, . . . ." In each column of a Y-direction, the reference numbers are arranged in an order of a highest number to a lowest number, for example, "7,6,5,4, 3,2,1,7, . . . ."

The arrangement of the reference numbers of FIGS. 3-4B may be made in consideration of the slanted angle of the line light source.

Figure 5:
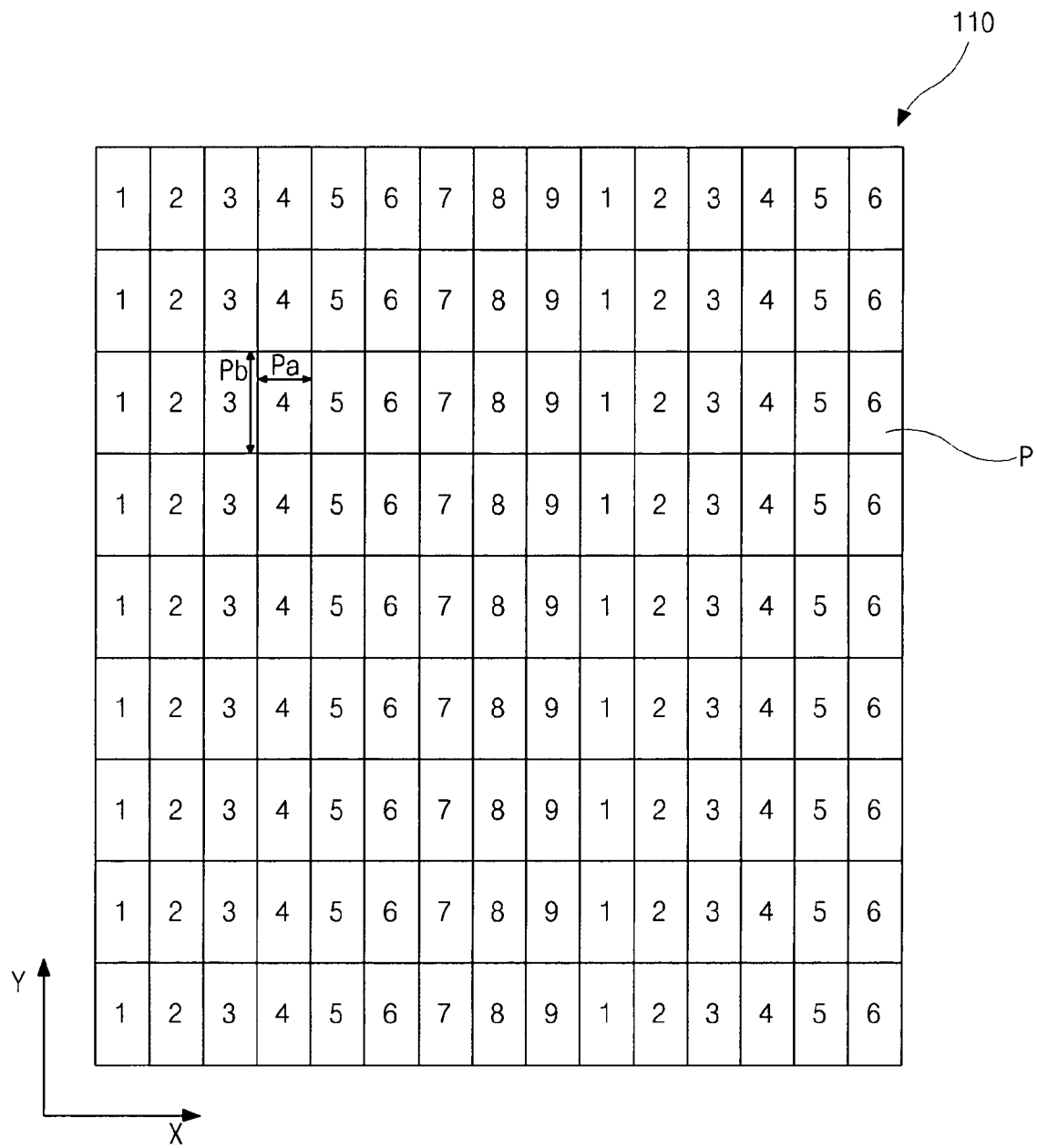
FIG. 5 is a view illustrating arrangement of pixels of a display device having line light sources parallel with a Y-direction.

FIG. 5 is a view illustrating arrangement of pixels of a display device having line light sources parallel with a Y-direction.

Referring to FIG. 5, the display device includes a display panel 110 having pixels P. Line light sources (not shown) are parallel with a Y-direction. For this arrangement of the line light sources, in a line of an X-direction, nine reference numbers are arranged in an order of a lowest number to a highest number, for example, "1,2,3,4,5,6,7,8,9,1, . . . ." In a column of a Y-direction, the same reference numbers are arranged, for example, "1,1,1,1,1, . . . ."

A resolution of a three-dimensional image when the display device has line light sources with a slanted angle with respect to an Y-direction and a resolution of a three-dimensional image when the display device has line light sources parallel with an Y-direction are explained with reference to FIGS. 3 and 5.

When the line light sources are parallel with the Y-direction, a reduction of a resolution of an image occurs only along the X-direction. In other words, referring to FIG. 5, the pixels P, having the same reference number, which are viewed at each view point are located continuously on the same column, and thus a resolution along the Y-direction of the image viewed at each view point is not reduced, compared to a total resolution along the Y-direction of the display device. The pixels having each of the reference numbers "1" to "9" are located every nine pixels in a line of a X-direction, and thus a resolution along the X-direction of the image viewed at each view point is reduced to a 1/9 of a total resolution along the X-direction of the display device. The total resolution of the image viewed at each view point is (the resolution along the X-direction)*(the resolution along the Y-direction)=(1/9)*1*R (R is the total resolution of the display device). A viewer views a three-dimensional image at each of nine view points with the resolution of R/9. In the display device of FIG. 5, for the image viewed at each view point, the resolution along the X-direction and the resolution along the Y-direction is much non-uniform, and thus display quality is caused degraded.

In the meantime, referring to FIG. 3, when a pixel group gr2 is defined to consist of the nine pixels P having reference numbers "1" to "9", the pixel group gr2 is repeated every two pixels along the Y-direction, and thus a resolution along the Y-direction of the image viewed at each view point is reduced to a ½ of a total resolution along the Y-direction of the display device. The pixel groups gr2 is repeated every K/2 (=9/2) pixels along the X-direction, and thus a resolution of along the X-direction of the image viewed at each view point is reduced to a 2/9 of a total resolution along the X-direction of the display device. The total resolution of the image viewed at each point is (the resolution along the X-direction)*(the resolution along the Y-direction)=(2/9)*(½)*R. A viewer views a three-dimensional image at each of nine view points with the resolution of R/9.

As described above, the three-dimensional images displayed by the display devices of FIGS. 3 and 5 have the same total resolution. However, for the image displayed by the displayed device of FIG. 3, not only the resolution along the X-direction but also the resolution along the Y-direction is reduced. Uniformity of the X-direction resolution and Y-direction resolution of the image displayed by the display device of FIG. 3 is improved compared to that of FIG. 5. Accordingly, the display device of FIG. 3 can display three-dimensional images having higher quality than that of FIG. 5.

Figure 6:
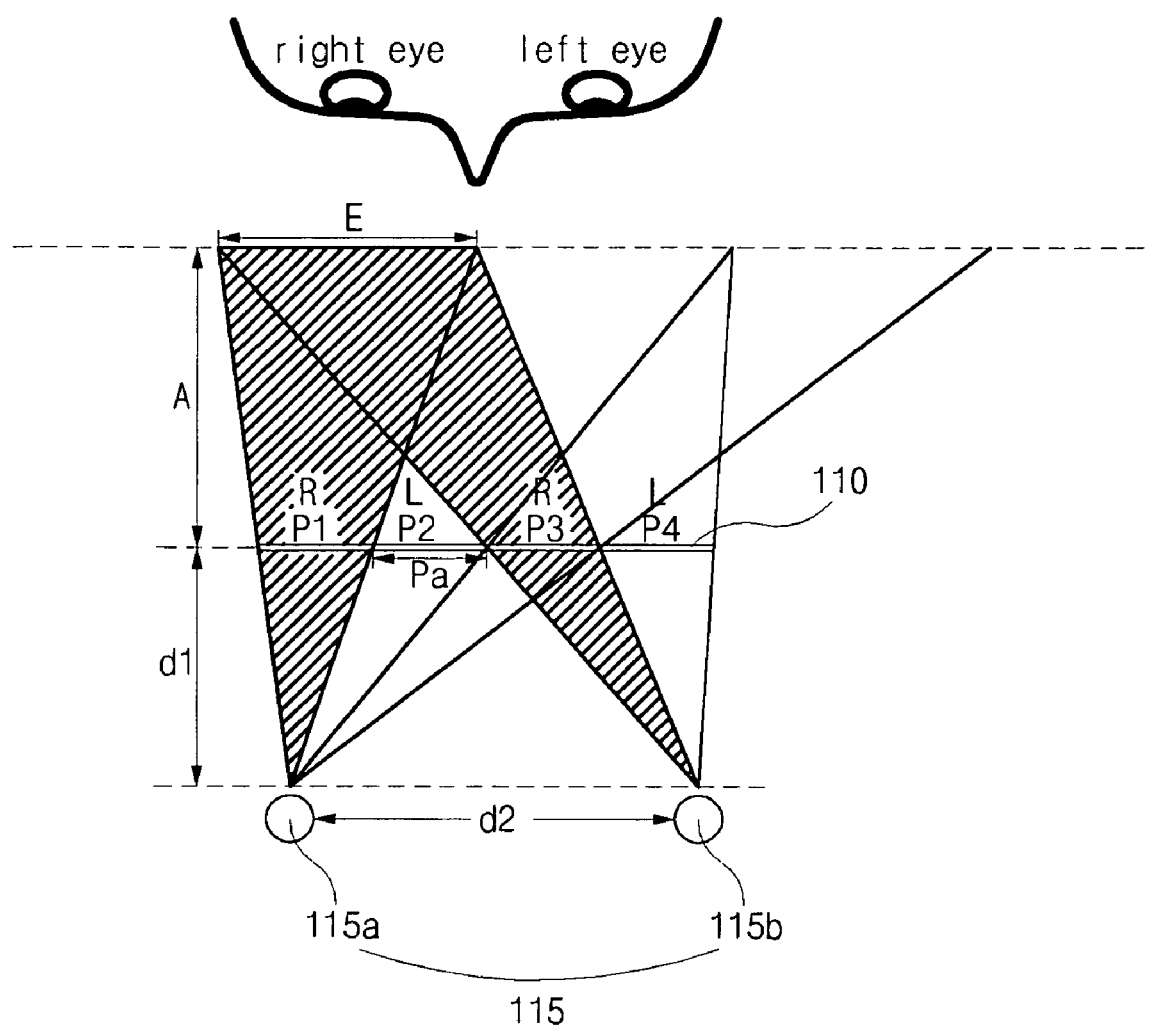
FIG. 6 is a view illustrating a method of displaying three-dimensional images in a display device according to the first embodiment of the present invention.

FIG. 6 is a view illustrating a method of displaying three-dimensional images in a display device according to the first embodiment of the present invention.

Referring to FIG. 6, a display panel 110 is located on a plurality of line light sources 115. The display panel 110 is spaced apart from the line light source 115 with a first distance d1. Adjacent first and second line light sources 115a and 115b are spaced apart from each other with a second distance d2. A viewer is spaced apart from the display panel 110 with a third distance A. The third distance A is a minimum distance to view three-dimensional images. A reference character E represents a width of a view point to view an image displayed at the view point.

The display device according to the first embodiment displays three-dimensional images without the parallax barrier of the related art, by using the line light sources having a width less than a width Pa of pixels P1 to P4 and appropriately adjusting the first to third distances d1, d2 and A and the width E of the view point.

Light emitted from the first line light source 115a passes through the first pixel P1 and then comes to a right (R) eye, but it does not come to a right eye through the second pixel P2. Light emitted from the first line light source 115a comes to a left (L) eye through the second pixel P2. In a similar manner, light emitted from the second line light source 115b comes to the right eye through the third pixel P3 and comes to the left eye through the fourth pixel P4. Accordingly, the first and third pixels P1 and P3 are supplied with data signals for a right eye image, and the second and fourth pixels P2 and P4 are supplied with data signals for a left eye image. The viewer combines the right and left images and perceives a three-dimensional image.

Light emitted from the first line light source 115a passing through the third and fourth pixels P3 and P4 comes to other view point to display a three-dimensional image.

To display three-dimensional images, the second distance d2 is expressed by a second expression, d2=K/(1/Pa−1/E), and the third distance A is expressed by a third expression, A=(d1*(E−Pa))/Pa. Based upon the third expression, the first distance d1 is expressed by a fourth expression, d1=(A*Pa)/(E−Pa).

The display device according to the first embodiment can display three-dimensional images without the parallax barrier of the related art. Accordingly, brightness can increase. Further, the backlight unit does not need the optical sheets of the related art to supply light uniformly to the liquid crystal panel. Accordingly, product cost can be reduced and brightness can further increase.

Figure 7A:
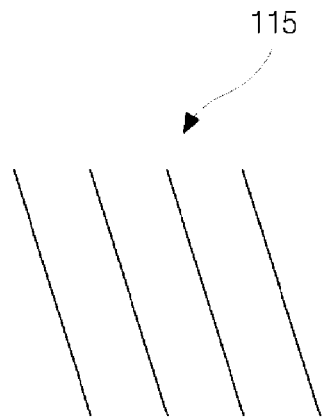
FIGS. 7A to 7C are views illustrating various types of line light sources in a display device according to the first embodiment of the present invention.
Figure 7B:
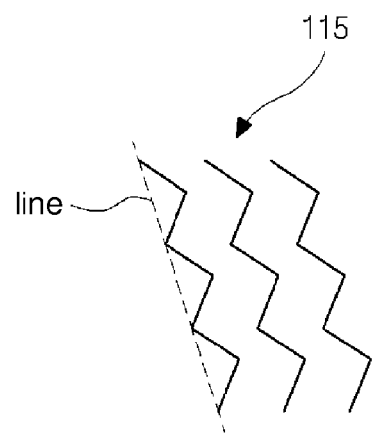
Figure 7C:
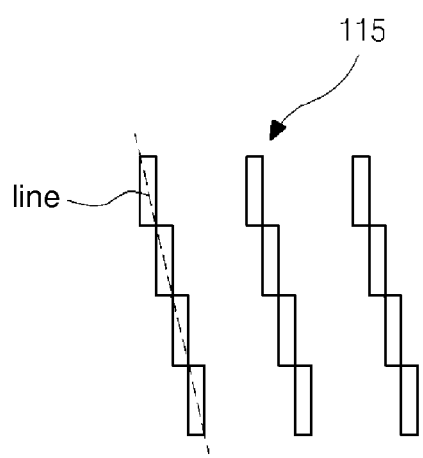

FIGS. 7A to 7C are views illustrating various types of line light sources in a display device according to the first embodiment of the present invention.

A line light source 115 may have a straight line shape as shown in FIG. 7A, or a zigzag shape as shown in FIGS. 7B and 7C. When the line light source 115 has the zigzag type, a plurality of light emitting diodes (LEDs) may be used. In other words, the LEDs may be arranged to form the zigzag-shaped line light source 115. A line connecting both ends of the zigzag-shaped line light source 115 may have the same slanted angle (the line connecting both ends being shown as a dotted line in FIGS. 7B-7C) as the straight-line-shaped line light source 115 so that the zigzag-shaped line light source 115 may substantially have the same function as the straight-line-shaped line light source 115.

Figure 8:
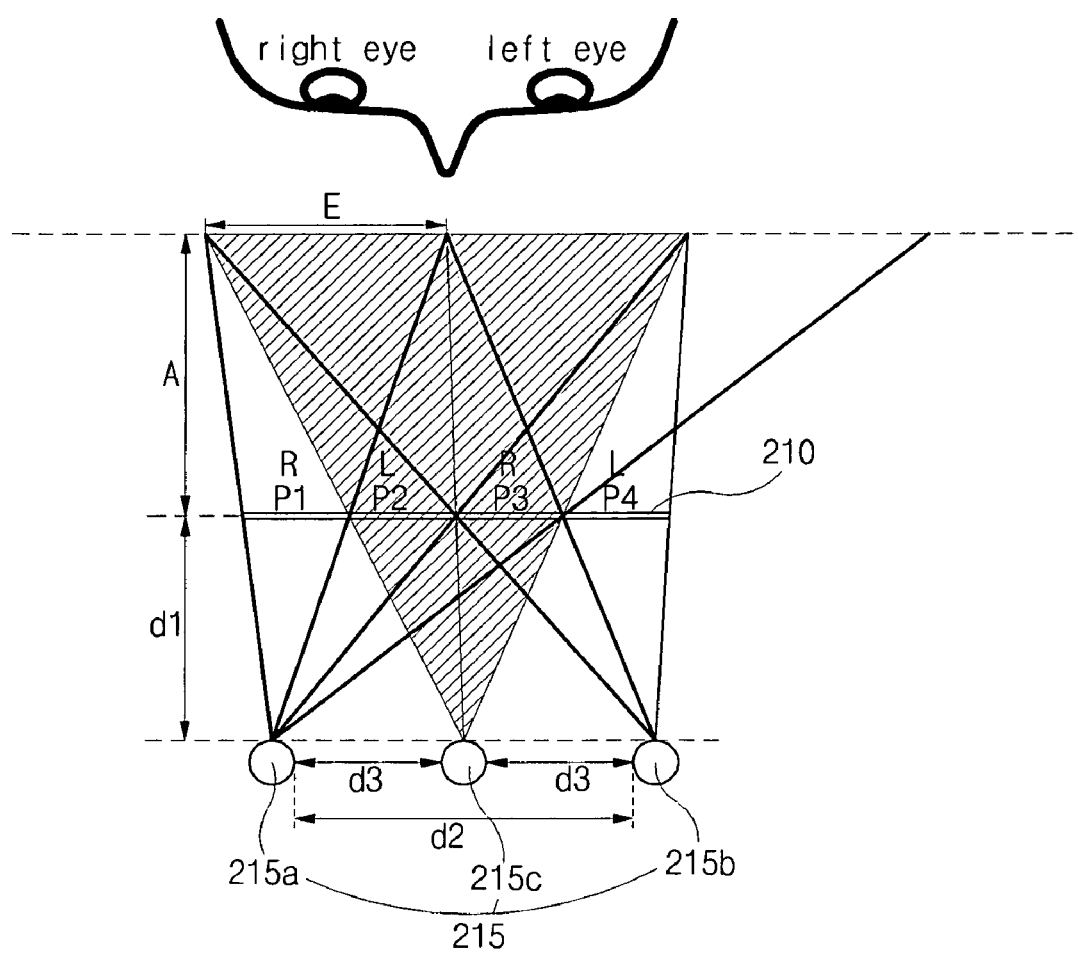
FIG. 8 is a view illustrating a display device according to a second embodiment of the present invention.

FIG. 8 is a view illustrating a display device according to a second embodiment of the present invention. Explanations of parts similar to parts of the first embodiment may be omitted.

Referring to FIG. 8, the display device of the second embodiment further includes a third line light source 215c located at a third line light region of a backlight unit, compared to the display device of the first embodiment. By using the third line light source 215c, the display device can selectively two and three-dimensional images with high brightness.

First and second line light sources 215a and 215b are spaced apart with a second distance d2. The third line light source 215c is parallel with and located between the first and second line light sources 215a and 215b. The third line light source may be located at a middle of the second distance d2 with a fourth distance d3 between the third line light source 215c and each of the first and second line light sources 215a and 215b. A width of the third line light source 215c may be equal to or more than the width of the first and second line light sources 215a and 215b.

The third line light source 215c may be turned on to display two-dimensional images. For example, when the third line light source 215c turns on, light emitted from the third line light source 215c comes to right (R) and left (L) eyes of a viewer through second and third pixels P2 and P3 of a display panel 210, respectively. In other words, all pixels P1 to P4 can be viewed at each of the right and left eyes by further turning on the third line light source 215c along with the first and second light sources 215a and 215b. Accordingly, when the third line light source 215c is turned on and data signals for two-dimensional images are supplied to all pixels P1 to P4, the viewer can view the two-dimensional images through the display device.

The third line light source 215c may be turned off to display three-dimensional images. For example, when the third line light source 215c turns off, the third line light source 215c is considered not to be existed and the display device of the second embodiment is operated in similar to the display device of the first embodiment. Accordingly, the display device can display three-dimensional images.

As described above, in accordance that the third line light source between the first and second line light sources is turned on or off, the display device can selectively the two and three-dimensional images. The display device of the second embodiment may have a switching control portion to turn on/off the third line light source. Arrangement of the components such as the line light source and the display panel may be made according to the first to third expressions as described in the first embodiment.

FIG. 9 is a view illustrating a display device according to a third embodiment of the present invention. Explanations of parts similar to parts of the first and second embodiments may be omitted.

Referring to FIG. 9, the display device of the third embodiment may have virtual line light sources 315 at line light regions by processing light emitted from original light sources 313.

The display device includes a display panel 310 and a backlight unit. The backlight unit includes a plurality of original light sources 313, a concentrating means 350 to concentrate light, and a scattering sheet 360.

The original light source 313 includes a CCFL (cold cathode fluorescence lamp), EEFL (external electrode fluorescence lamp), LED (light emitting diode) and a flat panel fluorescence light source.

The concentrating means 350 includes a lenticular portion 350 having a plurality of lenticular lens 352. The lenticular lens 352 has a hemi-cylindrical shape, and a convex portion of the lenticular lens 352 faces the original light source 313. The plurality of lenticular lens 350 concentrate light emitted from the original light sources 313 at a plurality of line light regions 315. The plurality of line light regions 315 may be located on a plane parallel with the display panel 310. The scattering sheet 360 is located at the plane of the plurality of line light regions 315. The concentrated light at each line light regions is scattered by the scattering sheet 360 and supplied to the display panel 310 in similar to the first and second embodiments. Accordingly, the line light regions 315 of the scattering sheet 360 function as the plurality of line light sources 315 of the first and second embodiments.

A second distance d2 between the adjacent line light regions 315 may depend on the concentrating means 350. The scattering sheet 360 may process the concentrated light which is directional to form the light which goes uniformly in all direction toward the display panel 310.

The line light regions 315 may have a slanted angle θ to display three-dimensional images. To do this, a length of the lenticular lens 352 may have a slanted angle θ with respect to a length of pixels P1 to P4. The slanted angle θ may be expressed by the first expression of the first and second embodiments. Further, the second distance d2 and the third distance A may be expressed by the second and third expressions, respectively, of the first and second embodiments. According to the first to third expressions, arrangement of the components of the display device may be made.

As described above, by using the light sources and the concentrating means, the line light can be made easily. Further, the display device displays three-dimensional images without the parallax barrier. Accordingly, brightness can increase. Further, the backlight unit does not need the optical sheets. Accordingly, product cost can be reduced and brightness can further increase.

It will be apparent to those skilled in the art that various modifications and variations can be made in the display device and a method of displaying an image of embodiments of the invention without departing from the spirit or scope of the invention. Thus, it is intended that embodiments of the invention cover the modifications and variations of this invention provided they come within the scope of the appended claims and their equivalents.

What is claimed is:

1. A display device, comprising:
a display panel including first to fourth pixels in a first direction, wherein each of the first to fourth pixels has a first width in the first direction and a length more than the width and in a second direction; and
a backlight unit including first and second line light regions supplying light to the display panel to display three-dimensional images,
wherein the first and second line light regions have a slanted angle in plane with respect to the second direction,
wherein light from the first line light region comes to right and left eyes of a viewer through the first and second pixels, respectively, and light from the second line light region comes to the right and left eyes through the third and fourth pixels, respectively,
wherein the display device has K view points,
wherein the first and second line light regions are slanted in plane with respect to the first direction, and
wherein the slanted angle is expressed by a expression, $\theta=\tan^{-1}((M*Pa)/(N*Pb))$, where Pa is the first width, Pb is the length of each pixel, and M and N are each natural numbers.

2. The device according to claim 1, wherein each of first and second light sources, which are located at the first and second line light regions, respectively, has a second width equal to or less than the first width.

3. The device according to claim 2, wherein each of the first and second line light sources has a straight line shape or a zigzag shape.

4. The device according to claim 3, wherein a line connecting both ends of each of the first and second line light sources having the zigzag shape has the slanted angle.

5. The device according to claim 2, further comprising a third line light source parallel with and between the first and second line light sources, wherein the third line light source is turned on to display two-dimensional images and is turned off to display the three-dimensional images.

6. The device according to claim 2, further comprising an absorbing sheet absorbing light incident on the absorbing sheet, wherein the first and second line light sources are between the display panel and the absorbing sheet.

7. The device according to claim 2, wherein the backlight unit includes a plurality of light sources, and a concentrating unit configured to concentrate light from the first and second line light sources.

8. The device according to claim 7, wherein the backlight unit further includes a scattering sheet which scatters the concentrated light at the first and second line light sources.

9. The device according to claim 7, wherein the concentrating means includes a plurality of lenticular lens having a semi-cylindrical shape.

10. The device according to claim 1, wherein:
a first distance between the display panel and a plane where the first and second line light regions are located is expressed by a expression, $d1=(A*Pa)/(E-Pa)$; and
a second distance between the first and second line light regions is expressed by a expression, $d2=K/((1/Pa)-(1/E))$,
where d1 and d2 are the first and second distances, respectively, A is a minimum distance between the display panel and the viewer, E is a width of each of the K view points, and Pa is the first width.

11. The device according to claim 1, wherein the display panel includes a liquid crystal panel.

* * * * *